March 25, 1969

E. KAZMAREK 3,434,342

FORCE SENSING APPARATUS

Filed Dec. 6, 1965

INVENTOR.
EDWARD KAZMAREK
BY
Christie, Parker & Hale
ATTORNEYS.

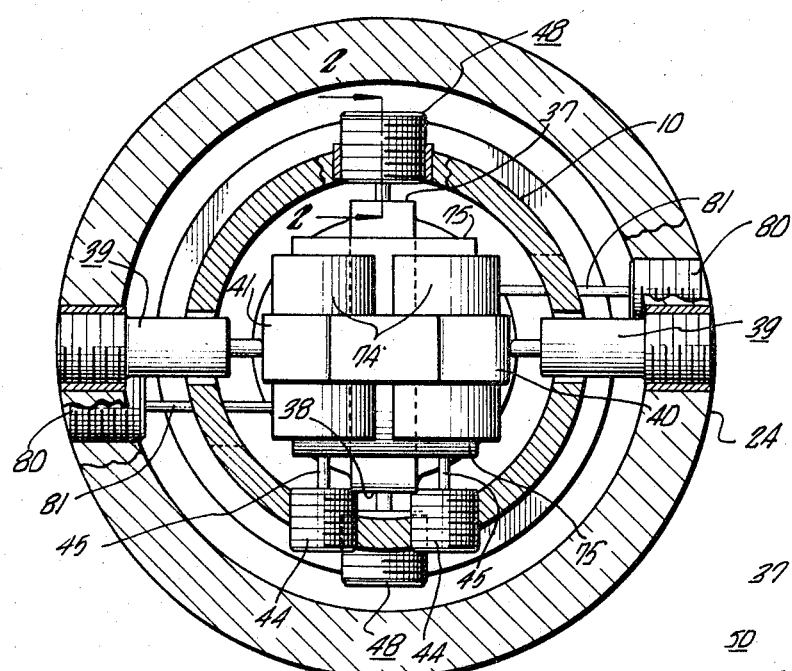
FIG_5_
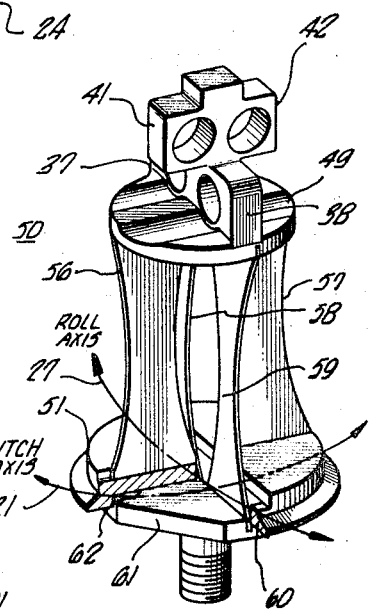
FIG_4_
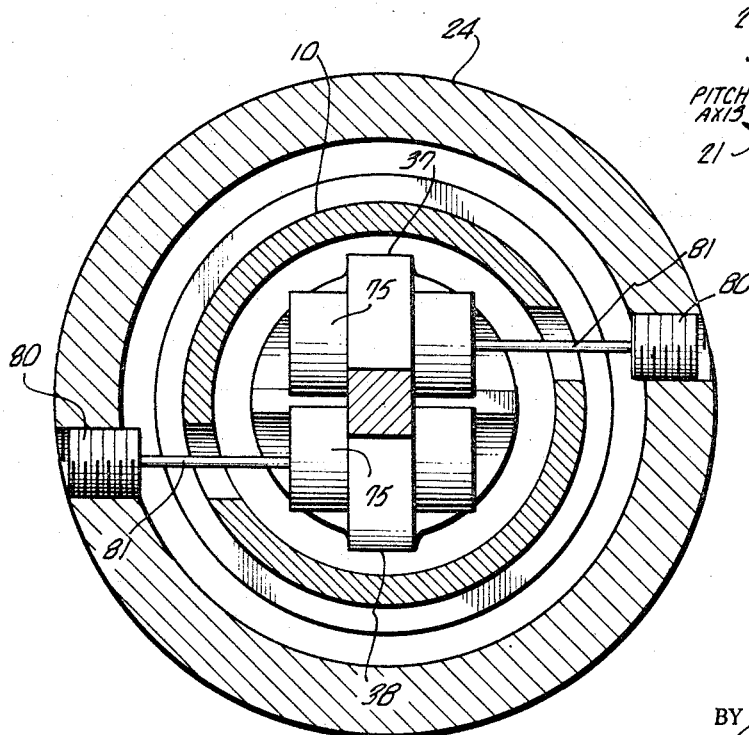
FIG_3_
INVENTOR.
EDWARD KAZMAREK

United States Patent Office 3,434,342
Patented Mar. 25, 1969

3,434,342
FORCE SENSING APPARATUS
Edward Kazmarek, Encino, Calif., assignor to Lear Siegler, Inc., Santa Monica, Calif., a corporation of Delaware
Filed Dec. 6, 1965, Ser. No. 511,786
Int. Cl. G01l 3/00
U.S. Cl. 73—133                                                      11 Claims

ABSTRACT OF THE DISCLOSURE

A tubular force receiving member is attached to a casing at a point intermediate of the ends of the member by a flexible diaphragm that permits the member to pivot at the point of attachment. Force is applied at one end of the member and transverse bending beams are located at the other end of the member. Each bending beam is capable of being deflected in one plane only, remaining rigid in the transverse plane. One beam is connected between the member and a first transducer that senses the relative deflection of the one beam. The other beam is connected between the casing and a second transducer that senses the relative deflection of the other beam.

---

This invention relates, in general, to apparatus for determining the direction and magnitude of a force applied to a force receiving member, and more particularly applies to an apparatus for converting mechanical deflections of the force receiving member into electrical signals proportional in phase and magnitude to the direction and amount of the applied force.

Devices for measuring forces in multiple directions are known in the art. Typical devices which are in existence are strain gauge transducers and associated linkages for determining the amount of deflection of a member subjected to a deflection force. These strain gauge transducers and other known prior art apparatus are not entirely satisfactory in that they are not stable under extreme temperature conditions. In addition, these and other prior art devices often exhibit a hysteresis effect, in the form of failure of the force member to return absolutely to an equilibrium or initial position once the deflection force has been removed from the force member. Stated in another way, known prior art devices exhibit considerable friction which results from numerous moving parts, and this friction contributes to false measurements and failure of the force member to return to its exact position which it held prior to application of the force to be measured. Such prior art devices thus generate false signals indicative of applied force equivalent to various amounts of hysteresis persent, even though in many instances, all forces to be measured have been removed.

The problems presented by prior art devices is further magnified in that such false signals, of course, are of a random nature, and are detrimental in system operations which must rely on accurate signals proportional to forces to be measured. One system operation which is particularly vulnerable is an automatic control system for aircraft and the like. These false and random signals, proportional to the foregoing mentioned hysteresis effects are continually being applied to the automatic control system which tends to make unwanted corrections in the aircraft's path.

A further problem not overcome by prior art devices results from numerous applications wherein the forces to be measured at a control grip such as a joystick, or other force receiving member, extend over a wide force range. This force range may extend, for example, from delicate touch to heavy force. In such instances, the force detecting device must operate satisfactorily throughout this extreme range of force applications, and must not become permanently overstressed from the large forces applied at one extreme of the force range. Concurrently, however, the force measuring device must be sensitive enough accurately to translate small forces to equivalent electrical signals. Prior to the advent of this invention, mechanical to electrical force translating devices of the prior art have not been capable of satisfactorily operating over such extreme force ranges.

The foregoing disadvantages of the prior art are avoided in accordance with the principles of this invention wherein a substantially frictionless suspension and force compliance mechanism measures forces applied to a control grip, or other force receiving member, by a new and novel structure. The mechanical to electrical force translation device of this invention exhibits little or no hysteresis, and accurately emits electrical signals proportional to forces over an extreme force range.

A force receiving member in accordance with this invention is secured by a stiff metal diaphragm at a fulcrum. Forces applied to the force receiving element cause a universal movement of the member about the diaphragm's fulcrum. At least two bending beams transversely oriented with respect to each other are fixedly mounted at one end in a common point. The remaining ends of the transversely oriented beams are each individually mounted to different points. One beam is secured to the force receiving member and the other beam is secured to a fixed support or structure.

Individual transducers are provided for each beam so that a force in any direction may be sensed and signals proportional to the force magnitude and the force direction are emitted in response to deflection movements by the member. These deflection movements are restrained and reacted to by the spring rate of at least one of the bending beams. The remaining beam, being transversely oriented with respect to the first beam, resists any bending movement due to force transverse to the direction in which it bends and thus serves as a relatively rigid support for housing a pair of monitoring transducers which are also transversely oriented with respect to each other. Accordingly, in one movement plane, the force receiving member has relative motion with respect to one transducer. This relative motion is detected by one of the transducers, and a signal proportional to that deflection is emitted. Forces applied to the force receiving member in a different movement plane also causes the force receiving member to move about the fixed fulcrum point at the diaphragm. The remaining transducer senses relative motion between the force receiving member and a fixed support or structure. Although both transducers operate independently of each other, their combined outputs may be utilized to provide a resultant signal which is representative of forces applied at any direction to the force receiving member. This unit is completely free of any frictional forces and the combined diaphragm and transversely oriented bending beam pair exhibit little or no hysteresis which is characteristic of the prior art.

The foregoing and other features of this invention may more readily be understood by reference to the accompanying drawings in which:

FIG. 3 is a cross-section view taken along the lines 3—3 in FIG. 1, showing a top view of a transducer pair and bending beam assembly for detecting forces applied in a pitch axis;

FIG. 4 is a cross-section view taken along the line 4—4 of FIG. 1, showing a top view of a transducer pair and bending beam assembly for detecting forces applied in a roll axis; and FIG. 5 is an isometric view partially broken away showing two pairs of interleaved and transversely oriented bending beams.

Figure 1:
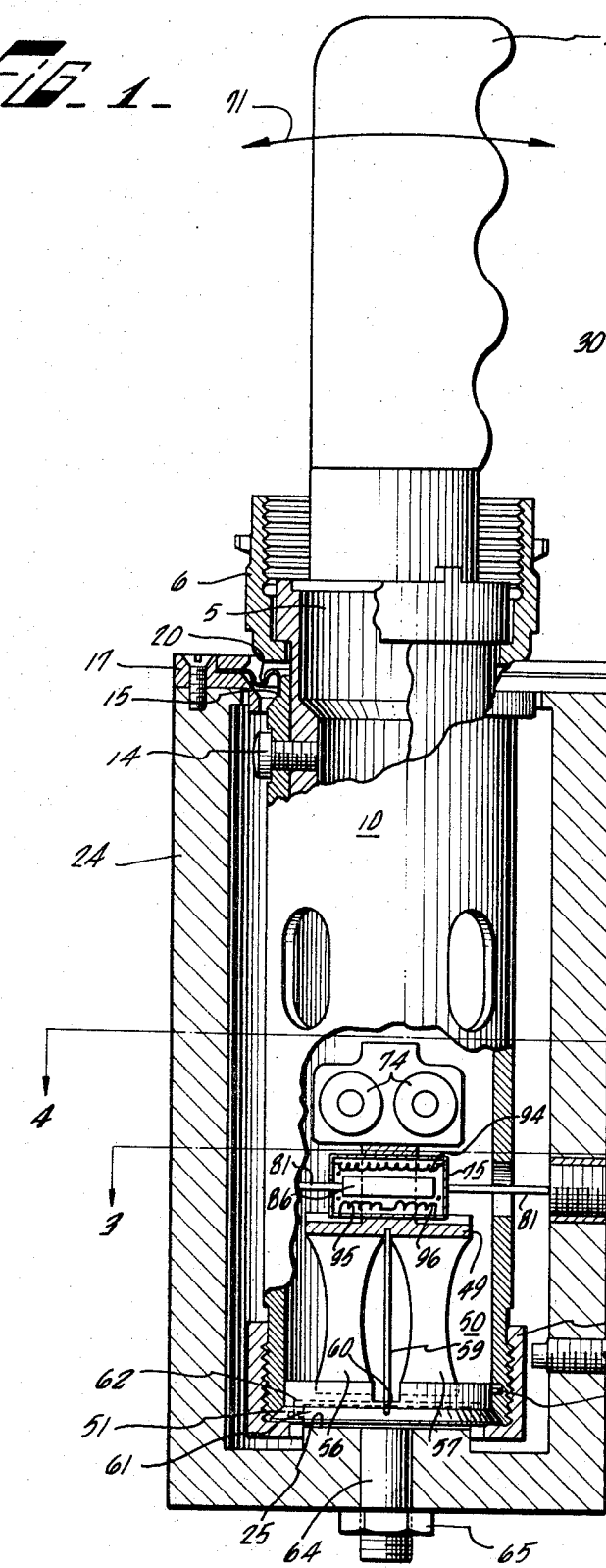
FIG. 1 is a side elevation partially broken away depicting the mechanical force sensing and electrical signal emitting device of this invention.

Turning now to FIG. 1, a force sensing device in accordance with the principles of this invention is shown comprising a control grip 4 which is secured to a deflection tube 10 by an adapter 5 and retaining nut 6. Adapter 5 and nut 6 securely join the control grip 4 to tube 10 as a solid integral unit. Adapter 5 at its bottom portion has a smaller diameter than tube 10 into which it is inserted and secured by a plurality of screws 14 or other suitable means.

Deflection tube 10 is a hollow cylinder which has a small offset shoulder 15 at its top. A stiff annular metal diaphragm 20 supports tube 10. Supporting diaphragm 20 is welded or otherwise fastened to tube 10 at shoulder 15. The remaining portion of diaphragm 20 is brazed or otherwise welded to a mounting disc 17. Disc 17 is permanently mounted to an outside structure, or casing 24. This outer casing 24 may be mounted on the joystick control of an aircraft or mounted in any other required location. Casing 24 may be movable with the joystick. It serves as one reference for sensing forces applied to control grip 4 in a manner fully described hereinafter.

The lower portion of deflection tube 10 houses a bending beam assembly 50. This bending beam assembly 50 includes a mounting ring 51 which is flanged and provided with an index pin 52 for its proper orientation in the bottom of deflection tube 10. A retaining nut 54 is threadably engaged with the lower threaded outside portion of deflection tube 10 to secure the mounting ring 51 to deflection tube 10.

Assembly 50 comprises two pairs of interleaved and transversely oriented bending beams 56, 57 (in the plane of the paper) and 58, 59 (transverse to the plane of the paper.) As shown by the side view of bending beam 59, each beam is a thin flat spring-like element which tends to oppose forces applied to its flat surface by an amount equal to its spring constant. For example, with reference to FIG. 5 forces applied in the pitch axis 21 will flex the pitch beams 58 and 59. Beams 56 and 57, referred to as the roll beams, will be flexed by forces applied in the roll axis 22.

It should be understood that each beam pair 56, 57 and 58, 59 are flexible independently of the other pair. For example, as shown in FIG. 1 and FIG. 5, the pitch beams 58 and 59 extend through a clearance slot 60 in roll beam mounting ring 51. Pitch beams 58 and 59 are brazed or otherwise fastened to a second beam housing ring 61. This beam housing ring 61 is undersized with respect to the diameter of the recessed cylinder 62 located in the bottom of the roll beam mounting ring 51. A threaded bolt 64 extends from the beam housing ring 61 through an opening in casing 24. Nut 65 secures the pitch beam mounting ring 61 to landing 25 of case 24. Mounting rings 51 and 61 are spaced apart so that deflection tube 10 may move free of any contact with mounting ring 61 unless an extremely large force is applied to control grip 4. Large forces applied to control grip 4 will cause the groove 62 in mounting ring 51 to come into contact with mounting ring 61 which is firmly secured to the casing 24 by the nut and bolt assembly 64, 65. These large forces are above the force range to be measured and represent an emergency situation. It is mandatory that such forces do not overstress the bending beam assembly and this possibility is prevented, in accordance with the principles of this invention, by absorbing such forces by the hefty landing 25 and casing 24. In addition, a plurality of overload stops 66 are threadably positioned around the deflection tube 10 to guard against any overloading or overstressing in bending beam assembly 50.

Two pair of transducers 74, 75 are positioned transversely with respect to one another and are mounted on the top plate 49 of bending beam assembly 50. These transducers may, for example, be differential transformers capable of sensing relative movement and generating electrical signals proportional to sensed movement. It should be understood, however, that only one pair of transducer means is required for emitting signals proportional to deflections in both the pitch and the roll axis. By providing one pair of transducers for each axis there is an added safety factor should one transducer fail in its operation. It should also be understood that other well-known transducer devices could be mounted on bending beam assembly 50 so long as the device chosen is capable of translating relative motion between the bending beam assembly 50 and deflection tube 10, in one direction, and between bending beam assembly 50 and the housing 24, in another direction, into signals proportional to the amount of deflection. Differential transformers 74 and 75 are particularly successful as transducers in this operation, in that they are compact, rugged, and reliable in operation.

Turning now to the operating principles of this invention and for ease of understanding, it will be assumed that the stick force sensing device of this invention is mounted on and employed in connection with a joy stick in an aircraft. Forces applied to the control grip 4 in the plane of the paper correspond to a pitch force, i.e., a force in a longitudinal direction with respect to the main axis of the aircraft. This force is converted to electrical signals which are, in turn, employed to control the pitch of the aircraft via any known auto pilot or power control system. Forces applied to control grip 4 which are transverse to the plane of the paper and correspond to roll forces. Signals developed from the force sensing device of this invention in response to these roll forces are utilized by circuitry in the aircraft to automatically achieve a roll command about the longitudinal axis of the aircraft. The electrical signals emitted by the force sensing device of this invention will mainly be utilized as a combination of both roll and pitch signals. For ease of understanding, however, the operating principles of the force sensing device of this invention will be described in connection with forces along one axis at a time starting with the assumed application of a pitch force, i.e. a force applied in the plane of the paper to control grip 4. The pitch force is shown symbolically by the double-headed arrow 71 and may be either left or right.

As described hereinbefore, control grip 4 is rigidly fastened to the deflection tube 10. Accordingly, a force 71 applied to control grip 4 will rotate the top and bottom of the assembly about the diaphragm 20 which is secured to casing 24 by disk 17.

Assuming that force 71 moves the control grip 4, to the left then, the bottom of deflection tube 10 will move to the right. In bending beam assembly 50, the bending beam pair 58 and 59 are positioned by the indexing pin 52 so that they represent flexible pitch beams capable of being deflected by pitch forces.

Conversely, the bending beam pair 56, 57 are so positioned that they are stiff and resist any motion in this plane. These beams thus hold the transducer pairs 74 and 75 in a fixed position relative to member 10. Stated differently, roll beams 56 and 57 do not flex and serve as rigid supports for the transducers 74 and 75 even though tube 10 moves in response to pitch force 71.

Movement of the bottom of deflection tube 10 to the right is opposed by the spring force of the pitch beam pair 58, 59, inasmuch as this pair of bending beams is secured to landing 25 of casing 24 by the nut and bolt assembly 64 and 65. Also secured to casing 24 by threaded screw 80 is a rod 81 having mounted on the end opposite the screw 80 an iron core 86 which forms one part of the differential transformer 75. Core 86 is slightly smaller than the elongated opening within the main transformer body 75 to assure freedom of movement for core 86 within transformer 75.

As shown in FIG. 1, the transformer windings of transformer 75 are depicted schematically as an excitation winding 94 and a pair of output windings 95 and 96. In an equilibrium position, the excitation voltage applied to excitation winding 94 is normally coupled equally to the output windings 95 and 96 which windings are wound in series opposing directions as shown by the conventional dot system. Under these conditions, there is no net output voltage present at windings 95 and 96 because core 86 establish equal inductive coupling for excitation from winding 94 to windings 95 and 96.

In accordance with the operation just described, force 71 causes deflection tube 10 to move to the right. Beams 56 and 57 remain rigid and simultaneously move transformer 75 to the right. This movement repositions core 86 within transformer 75 and thus decreases the inductive coupling between winding 94 and winding 96. At the same instant the inductive coupling between winding 94 and output winding 95 is increased. The net result is an output signal which is of proper polarity and magnitude at output winding 95 so as to indicate a forward pitch force on control grip 4. The polarity of this output signal remains the same for all forward pitch forces, and merely increases or decreases in a manner proportional to the amount of deflection of tube 10.

In accordance with the foregoing description, if force 71 were applied in the opposite direction, i.e. to the left, then the inductive coupling conditions in transformer 75 is opposite to that just described. In this condition, therefore, the output signal would be of opposite polarity from the first example. Again this opposite polarity signal varies in magnitude roportional to the amount of deflection as just described.

To summarize the operation thus far in accordance with the principles of this invention, one bending beam pair (either 56, 57 or 58, 59) is oriented so as to remain rigid in its edge plane irrespective of its own flexure and irrespective of the flexure of the other bending beam pair. This rigidity, in a new and novel manner in this invention, assures that one deflection sensitive transducer maintains a fixed reference with respect to the tube movements so that the tube movement relative to a fixed support, or casing, may be monitored. The remaining bending beam pair is rigid in its edge plane and is secured to the fixed support, or casing, so that the remaining deflection sensitive transducer is fixed with respect to the support so that the tube movement with respect to this transducer, and therefore the support, can be monitored. These beam pairs, in addition to the diaphragm, are utilized as mechanical springs in order accurately to return the deflection tube to its initial condition whenever applied forces are removed. There is thus no sliding or rolling parts in the force sensing device of this invention. It is free of common friction presented by such sliding or rolling parts in prior art devices.

The operation of the device in FIG. 1 is now described with respect to a force applied into the paper which force as mentioned hereinbefore corresponds to a lateral force for achieveing a roll movement of the aircraft. This roll force again causes the deflection tube 10 to rotate about the diaphragm 20 secured at its rim by disk 17 to the fixed casing 24. The lower end of the deflection tube 10, in response to the roll forces, moves in and out of the plane of the paper. The rigid edge plane of beams 58 and 59 are fixed to casing 24 in the manner described hereinbefore. Thus, the upper end of the beam assembly 50 including transformers 74 and 75 remains fixed with respect to the casing 24. Accordingly, tube 10 moves relative to the transducer of transformer 74.

Reference to FIG. 4 which is a top view taken along the lines 4—4 of FIG. 1 discloses that the transducers for detecting deflection resulting from a roll force may be a redundant pair of differential transformers 74. Differential transformers 74 include set screws 44 which are threadably mounted in the wall of tube 10. Rods 45 are brazed or otherwise mounted in set screws 44. These rods 45 hold the iron core portion (not shown) of transformers 74 in the housing in a manner similar to that described hereinbefore with respect to FIG. 1.

It should be also understood by reference to the description hereinbefore that the position of differential transformers 74 and 75 may be interchanged providing that their associated iron core supporting mechanisms are also changed whereby two independent measurements are achieved. One measurement must be of relative movement between the transducer and the bending tube 10, and the second measurement must be of relative movement between a transducer and the casing 24. Of course, the manner of transducer mounting is limited only by these measurements to be made and is not liimted to the particular embodiment shown in FIG. 3 and FIG. 4.

As mentioned hereinbefore, it is a feature of this invention that the circular diaphragm allows universal movement of the deflection tube 10 about the annular fulcrum points which support the diaphragm. It is generally true in most applications, and particularly true in aircraft, that devices which reflect any force on a control grip 4 are subjected to an extreme force range as discussed hereinbefore. The device of this invention exhibits little or no hysteresis over such extreme range in applied force. In addition to the possibility of overstressing discussed hereinbefore, this extreme force range presents an entirely different problem at the extreme wherein a delicate touch is applied to the control grip 4. It is mandatory that the device of this invention ignore such very light touches below a predetermined minimum amount. For example, the amount must be sensitive enough to respond to a force of one pound which is a typical force by a pilot who consciously intends to move control grip 4. Conversely, it must not respond to the mere presence of his hand on the control grip 4, i.e. it must exhibit a minimum sensitivity.

Figure 2:
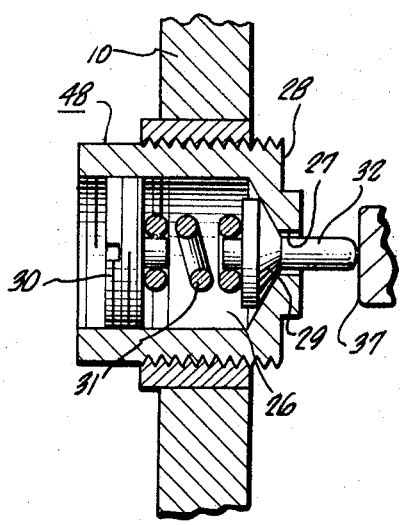
FIG. 2 is a cross-section view taken along the line 2—2 of FIG. 4.

This minimum sensitivity is achieved in accordance with the principles of this invention by utilizing a plurality of preloaded inserts one pair in each force axis. One preloaded insert 48 is shown in cross section in FIG. 2 as it would be mounted to establish a preloaded condition for pitch forces. The preloaded insert 48 comprises an elongated hollow cylinder 28. The cylinder 28 is threaded at one end and is threadably inserted into a threaded opening in tube 10. An enlarged chamber 26 is threaded on the inside so that a spring 31 and threaded spring keeper 30 may be inserted into the chamber. A shouldered pin 29 is first inserted into the chamber 26 and is loaded against the end wall of the chamber. Pin 29 has an elongated shank 32 which extends through a longitudinal bore 27 in cylinder 28. Spring 31 thus bears against the keeper and the shoulder pin 29 with a predetermined compressive force. Shank 32 of pin 29 rests against an end wall 37 of a mounting frame for the pitch sensing transformer 75, FIG. 5. Another preloaded insert 48 in FIG. 4, rests against the opposite end wall 38, FIG. 4, to preload the sensing device of this invention for pitch forces in both directions. Thus, regardless of the direction of the force initially applied to control grip 4 there is a predetermined minimum amount of pitch force necessary before any relative movement may occur between tube 10 and housing 24.

A pair of inserts 39, FIG. 4, also rest against the end walls 41 and 42 of the mounting frame for the roll sensing transformer 74 to establish preloaded minimum forces for roll forces. These inserts 39 are threadably mounted in casing 24 and extend through oversized clearance holes in tube 10. Inserts 39 are similar in operation to insert 48 of FIG. 2 and thus the details need not be repeated here.

Bending beams for the pitch and roll axis need not be interleaved as described hereinbefore, but may be stacked one on top of the other in transversely oriented positions as another alternative. Additionally, it should be understood that control grip 4 may be moved in any direction and is not limited to only pitch and roll movements. The rigidity of the edge planes of bending beam assembly 50, maintains the transducers in the positions described in detail hereinbefore, even when assembly 50 is flexed.

It is to be understood that the foregoing features and principles of this invention are merely descriptive, and that many departures and variations thereof are possible by those skilled in the art, without departing from the spirit and scope of the invention.

What is claimed is:

1. A force sensing device comprising:
   (a) an elongated member for receiving forces to be measured,
   (b) a flexible diaphragm fastened to said member intermediate of the ends thereof to provide universal movement of said member around its original position,
   (c) a fixed support adjacent said member for housing said diaphragm, said housed diaphragm providing universal restraining forces to return said member to its original position when the forces applied to said member are removed,
   (d) at least a first and second bending beam with said first beam transversely oriented with respect to said second beam, each of said beams being flexible in a flat plane and rigid in an edge plane transverse to said flat plane,
   (e) means fixedly mounting said first beam to said member for flexible movement of said first beam when said member moves in a first direction, said flexible movement of said first beam tending to return said member to its original position,
   (f) means fixedly mounting said second beam to said fixed support for flexible movement of said second beam when said member moves in a second and different direction, said flexible movement of said second beam also tending to return said member to its original position,
   (g) first transducer means rigidly maintained for simultaneous movement with said member by said edge plane of said first beam, said first transducer means being mechanically coupled to said fixed support for generating a first electrical signal in response to movement of said member and therefore said first transducer means relative to said support, and
   (h) second transducer means rigidly maintained in a fixed position relative to said fixed support by said edge plane of said second beam, said second transducer means being mechanically coupled to said member for generating a second electrical signal in response to movement of said member relative to said fixed support and therefore said fixed position of said second transducer.

2. Apparatus in accordance with claim 1 and further comprising:
   (a) first preloaded means secured to said support for opposing any relative movement between said first transducer means and said support less than a movement amount corresponding to a predetermined minimum force applied to said member, and
   (b) second preloaded means secured to said member for opposing any relative movement between said second transducer means and said member less than a movement amount corresponding to a predetermined minimum force applied to said member.

3. Apparatus in accordance with claim 1 and further comprising:
   (a) force absorbing means at said support and spaced a predetermined distance from said member for limiting movement beyond said spaced distance of said member in response to heavy forces applied thereto.

4. Apparatus for translating mechanical forces to electrical signals comprising:
   (a) a member for receiving applied forces to be translated;
   (b) a flexible support for positioning said member in an original location and allowing movement of said member in response to said applied forces, said flexible support being operable to return said member to its original location when said applied forces are removed;
   (c) a fixed casing spaced from said member and connected thereto by said flexible support;
   (d) a first bending beam spring coupled to said member, said first beam being flexible in one direction and stiff in a direction transverse to said one direction;
   (e) a second bending beam spring coupled to said casing, said second beam being flexible in said transverse direction and stiff in said one direction; and
   (f) first and second signal emitting means transversely oriented with respect to each other and respectively aligned with said first and second bending beams for emitting signals proportional to the direction and magnitude of movements of said member relative to said fixed casing, said first signal emitting means being positionably fixed relative to said casing by the stiffness of said second beam and being movable relative to said member by the flexing of said first beam, said first signal emitting means being responsive to the flexing of said first beam relative to said member to emit first signals of polarity and magnitude respectively proportional to the direction and amount of movement of said member in said one direction.

5. Apparatus in accordance with claim 4, in which said second signal emitting means is positionably fixed relative to said member by the stiffness of said first beam and is movable relative to said casing by the flexing of said second beam, said second signal emitting means being responsive to the flexing of said second beam relative to said casing to emit second signals of polarity and magnitude respectively proportional to the direction and magnitude of movement of said member in said transverse direction.

6. Apparatus in accordance with claim 5 wherein:
   (a) means are coupled between said first and second signal emitting means and said member and casing for preventing movement of said member responsive to forces less than a predetermined amount.

7. Apparatus in accordance with claim 6 wherein said last claimed means comprises:
   (a) a first pair of inserts positioned between said casing and said second signal emitting means for preventing movement of said second signal emitting means relative to said fixed casing in said transverse direction responsive to forces in said transverse direction less than a predetermined amount.

8. Apparatus in accordance with claim 7 wherein:
   (a) said last claimed means further comprises a second pair of inserts positioned between said first signal emitting means and said member for preventing movement of said member relative to said first signal emitting means in said one direction responsive to forces in said one direction less than a predetermined amount.

9. Apparatus in accordance with claim 4 and further comprising:
   (a) force absorbing means at said casing and spaced a predetermined distance from said member for limiting movement beyond said spaced distance of said member in response to heavy applied forces thereto.

10. Apparatus in accordance with claim 4, wherein the flexible support is a flexible annular diaphragm extending between said fixed casing and said member.

11. Apparatus for sensing force comprising:

an elongated member for receiving forces to be measured;
a casing surrounding the elongated member;
means for connecting said casing to said elongated member intermediate of its ends so as to provide universal movement of said member;
a movable plate;
a first deflectable beam fixed at one end to said casing and fixed at the other end to said plate, said first beam being flexible in a first direction and being rigid in a second direction transverse to said first direction;
a second deflectable beam fixed at one end to said member and fixed at the other end to said plate, said second beam being flexible in said second direction and being rigid in said first direction;
means for sensing the movement of said plate in said first direction relative to said casing; and
means for sensing the movement of said plate in said second direction relative to said member.

References Cited

UNITED STATES PATENTS

| | | | |
|---|---|---|---|
| 2,505,070 | 4/1950 | Shaw | 73—133 |
| 2,895,086 | 7/1959 | Pettit | 336—30 XR |
| 3,217,536 | 11/1965 | Motsinger et al. | 73—141 XR |
| 3,223,846 | 12/1965 | Rochester | 73—188 XR |

OTHER REFERENCES

Instrument Practice: January 1955, pp. 56 and 65, copy in 73–141.

RICHARD C. QUEISSER, *Primary Examiner.*

C. A. RUEHL, *Assistant Examiner.*

U.S. Cl. X.R.

336—30